United States Patent [19] Smith

[11] 3,958,051
[45] May 18, 1976

[54] COMPOSITE LABEL WEB AND METHOD OF MAKING SAME

[75] Inventor: Thomas M. Smith, Dayton, Ohio

[73] Assignee: Monarch Marking Systems, Inc., Dayton, Ohio

[22] Filed: Jan. 17, 1975

[21] Appl. No.: 541,960

Related U.S. Application Data

[62] Division of Ser. No. 278,409, Aug. 7, 1972, Pat. No. 3,892,901.

[52] U.S. Cl. .................................... 428/42; 40/2 R; 156/152; 156/252; 156/253; 156/268; 156/289; 156/510; 83/1; 83/30; 283/21

[51] Int. Cl.$^2$ ......................... B32B 3/16; B32B 7/06

[58] Field of Search ........... 156/151, 152, 250, 252, 156/253, 257, 268, 289, 510; 428/40-43, 131, 134-136; 40/2 R; 283/18, 21; 83/1, 11, 12, 30

[56] References Cited

UNITED STATES PATENTS

| | | | |
|---|---|---|---|
| 2,095,437 | 10/1937 | Fox | 283/21 |
| 2,303,346 | 12/1942 | Flood | 156/152 |
| 2,424,508 | 7/1947 | Simmonds | 156/252 |
| 2,636,297 | 4/1953 | Johnson | 156/253 |
| 2,946,281 | 7/1960 | Sohn | 156/264 |
| 2,984,342 | 5/1961 | Smith | 156/264 |
| 3,115,417 | 12/1963 | Christensen | 428/43 |
| 3,253,544 | 5/1966 | Von Hote | 156/352 |
| 3,501,365 | 3/1970 | Marshall | 156/283 |
| 3,706,626 | 12/1972 | Smith et al. | 156/268 |

OTHER PUBLICATIONS

DataMark Stock Labels advertisment of Summer 1967 Cleveland, Ohio.

*Primary Examiner*—William A. Powell
*Assistant Examiner*—John E. Kittle
*Attorney, Agent, or Firm*—Joseph J. Grass

[57] ABSTRACT

Disclosed are a method of making composite label webs and also composite webs made by practicing the method. The disclosed method includes the steps of providing a relatively wide composite web having a web of pressure-sensitive label material releasably adhered to a web of supporting material, slitting the label material longitudinally, removing the label material between closely spaced-apart slits formed by the slitting and between the slits at the marginal side edges of the composite web and the respective side edges of the composite web to form a plurality of closely spaced-apart narrow label webs on the web of supporting material and thus leaving longitudinally extending zones of exposed supporting material, and cutting holes at longitudinally spaced-apart locations through at least one marginal side edge of each narrow label web and through the underlying supporting material and through the supporting material in the adjacent zone. The narrow label webs are either partially or completely severed transversely at longitudinally spaced apart locations along lines extending through the holes to form the label webs into labels. In some embodiments, the supporting material is slit between the narrow label webs through the holes to provide narrow label webs having a narrow strip of supporting material exposed at least at its one marginal side edge. In another embodiment, instead of slitting the supporting material between the narrow label webs, the supporting material is partially severed between the narrow label webs; the labels of this embodiment can be printed by feeding the composite web through a high speed printer.

3 Claims, 17 Drawing Figures

FIG-2
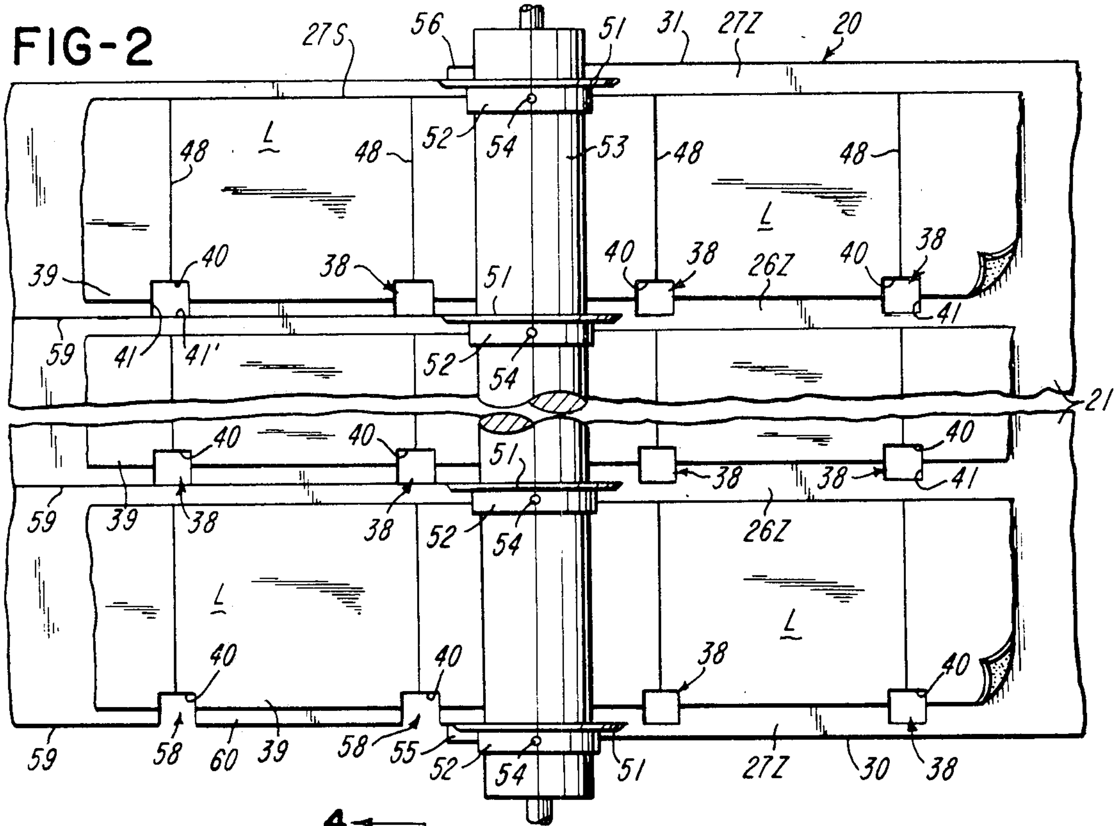
FIG-3
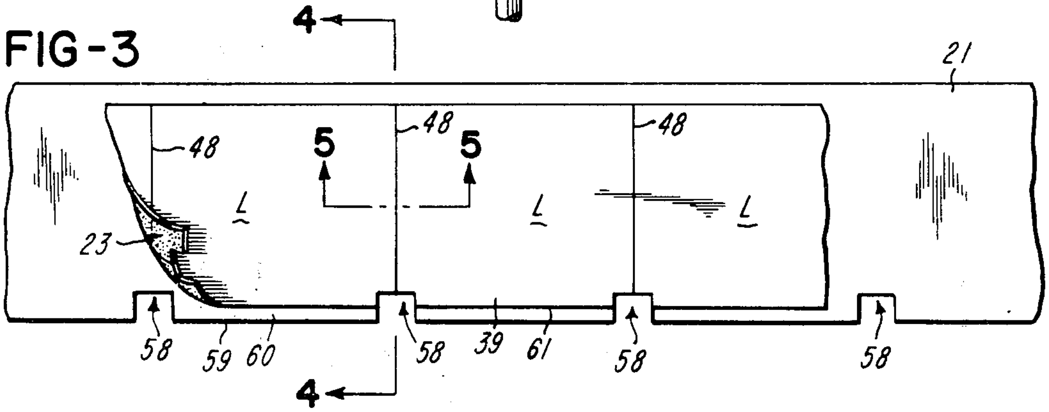
FIG-4
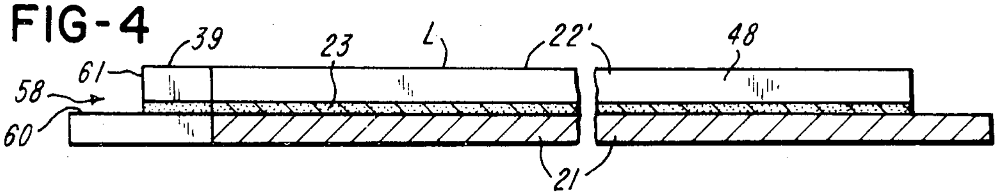
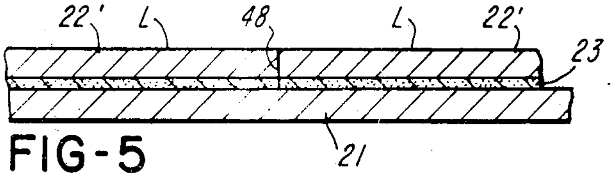
FIG-5

FIG-7
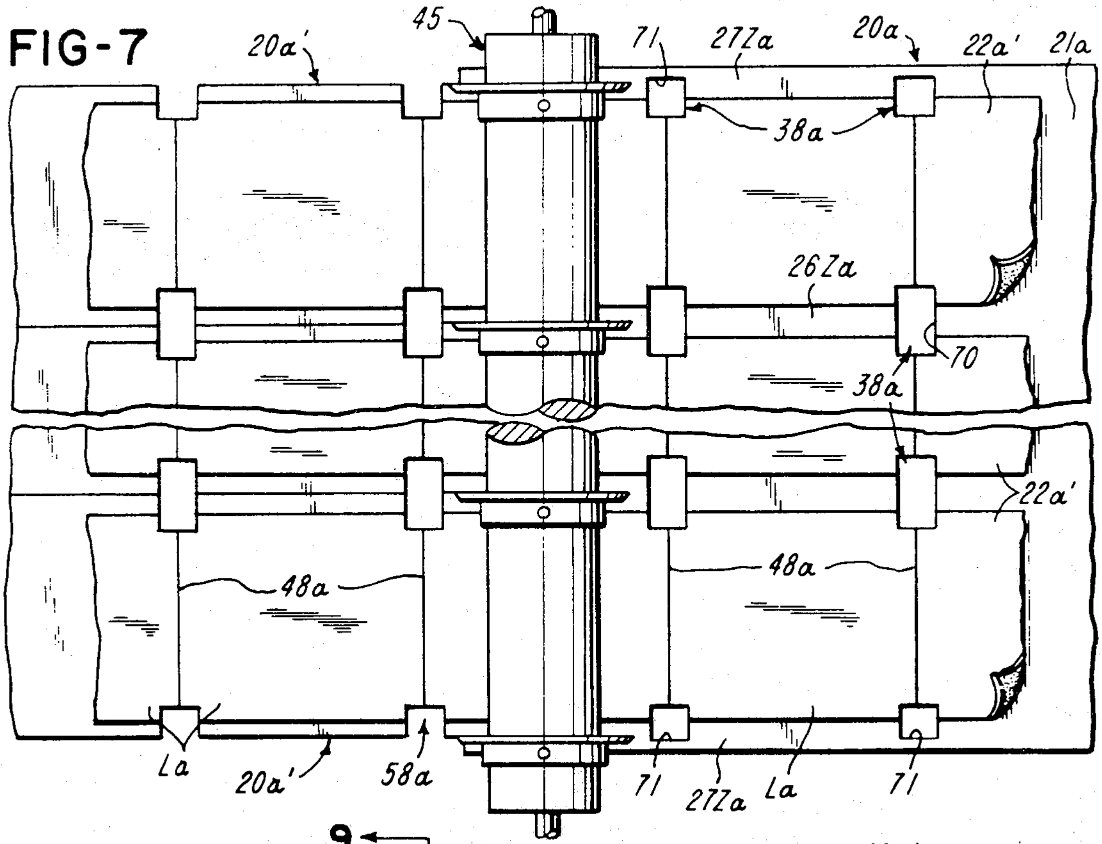
FIG-8
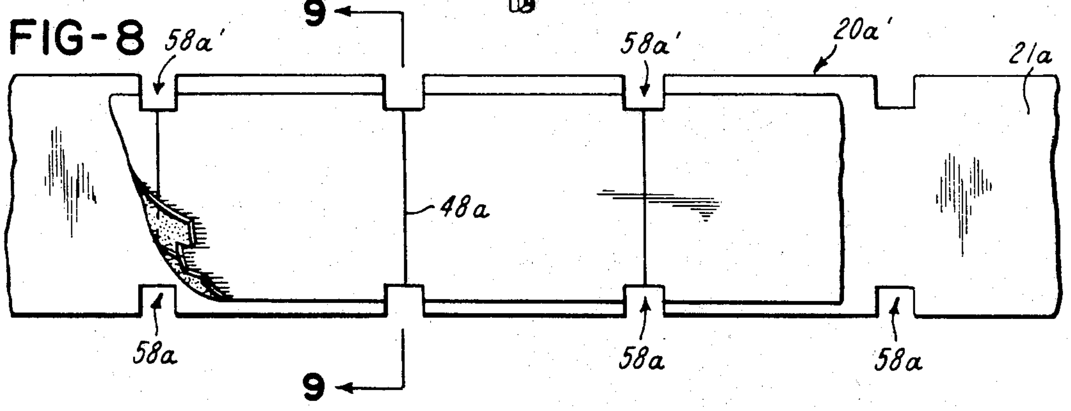
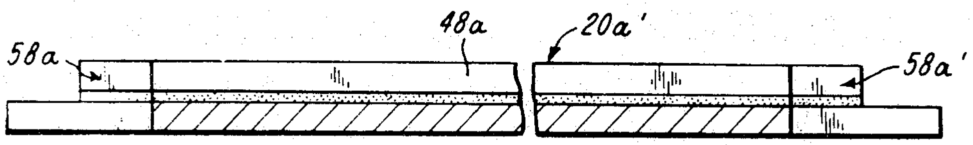
FIG-9

FIG-10
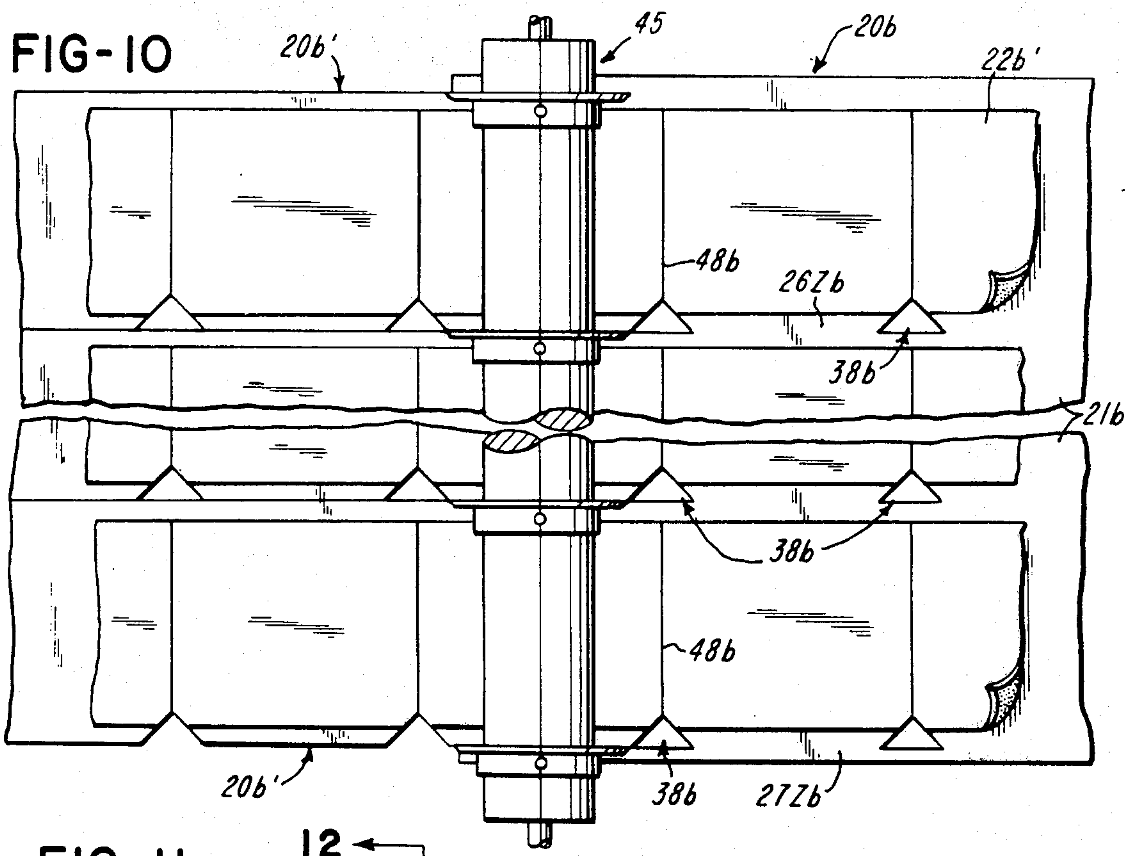
FIG-11
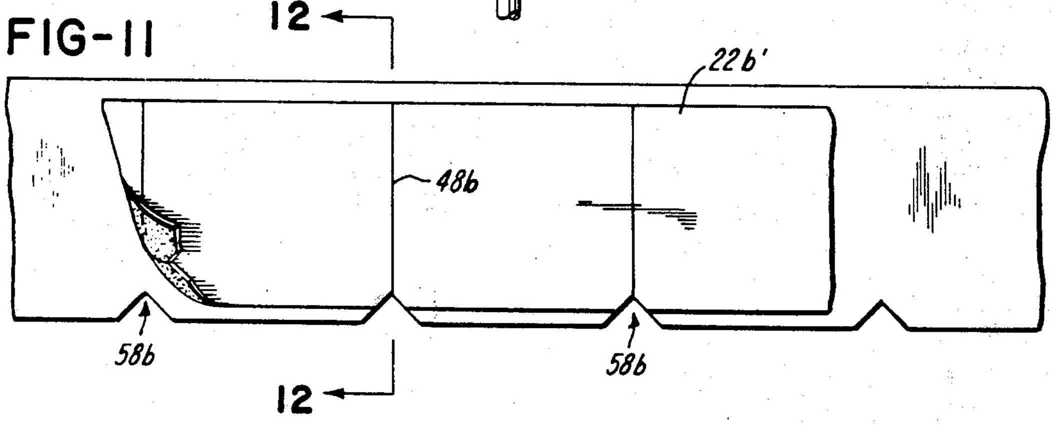
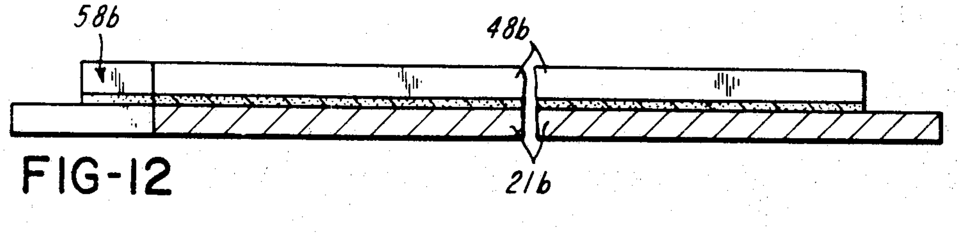
FIG-12

FIG-13
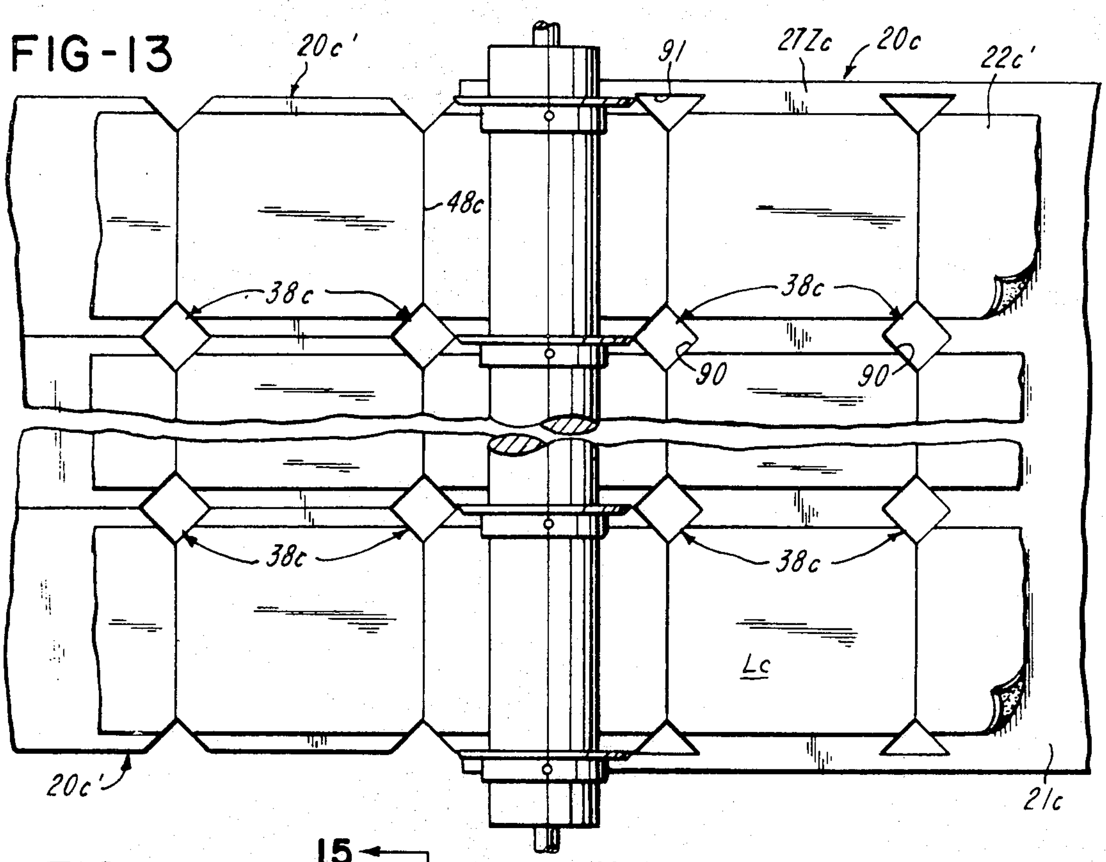
FIG-14
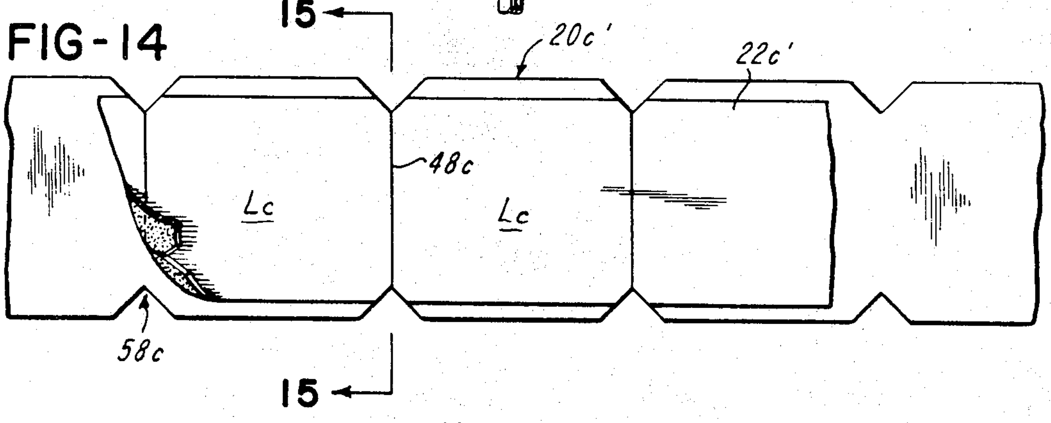
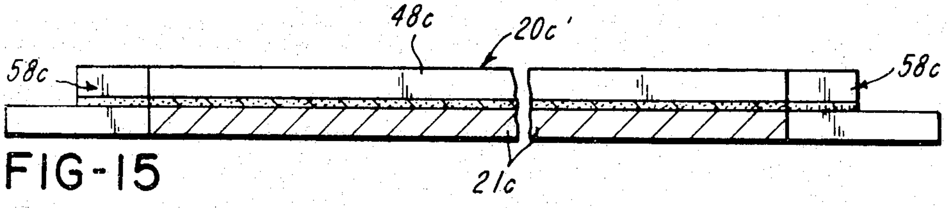
FIG-15

COMPOSITE LABEL WEB AND METHOD OF MAKING SAME

This is a divisional application of prior application Ser. No. 278,409 filed Aug. 7, 1972 which is now U.S. Pat. No. 3,892,901.

BACKGROUND OF THE INVENTION

1. Field of the Invention

This invention relates to the art of making composite label webs and to composite label webs.

2. Brief Description of the Prior Art

Illustrative U.S. Pat. Nos. relating to the art are: Fox 2,095,437; Flood 2,303,346; Avery 2,304,787; Avery 2,391,539; Avery 2,783,172; Singer 3,383,121; Marshall 3,501,365; and Williams et al. 3,522,136. A prior development by Thomas M. Smith and Walter D. Gregory is disclosed in copending U.S. patent application Ser. No. 157,913, filed June 29, 1971, and owned by the assignee of the present application, now U.S. Pat. No. 3,706,626.

SUMMARY OF THE INVENTION

The invention resides in an improved method of making composite pressure-sensitive label webs and to composite pressure-sensitive label webs.

A specific embodiment of the method comprises the steps of providing a longitudinally extending wide web including a web of supporting material and a web of pressure-sensitive label material having pressure-sensitive adhesive and being releasably adhered to the support material, slitting only the label material longitudinally to form at least one pair of closely spaced-apart slits, stripping away the label material between the slits, whereby the web of label material is transformed into a plurality of closely spaced-apart narrow label webs on the web of supporting material, and cutting holes in at least one marginal side edge of each narrow label web and into the underlying and adjacent supporting material. Some embodiments of the invention comprise the further steps of slitting the supporting material between the narrow label webs into the holes to provide a plurality of narrow composite webs. The resultant narrow composite webs have notches in at least one marginal side edge which can be sensed by a suitable mechanical or optical sensor in a label applicator, in a recorder such as an imprinter or a perforator, or in a reader; the notches can also be used in feeding the composite web through one of the above types of devices.

In another embodiment, the method further comprises the steps of at least partially severing the label material webs transversely into labels along longitudinally spaced-apart lines extending through at least some of the holes, and partially severing the supporting material along at least some of the transverse lines. Additionally, the supporting material can be partially severed in the longitudinal zones, and means to facilitate feeding of the composite web through a high speed printer can be provided at the marginal side edges of the composite web.

BRIEF DESCRIPTION OF THE DRAWINGS

FIG. 2 is a partly broken away top plan view of portions of the wide composite web and the composite label webs shown in FIG. 1;

FIG. 3 is a top plan view of a fragmentary portion of one of the composite label webs shown in FIGS. 1 and 2;

FIG. 4 is a sectional view taken along line 4—4 of FIG. 3;

FIG. 5 is a sectional view taken generally along line 5—5 of FIG. 3;

FIG. 7 is a top plan view similar to FIG. 2, but illustrating another embodiment of the invention;

FIG. 8 is a top plan view of a fragmentary portion of one of the composite label webs shown in FIG. 7;

FIG. 9 is a sectional view shown taken along line 9—9 of FIG. 8;

FIG. 10 is a top plan view similar to FIG. 2, but illustrating another embodiment of the invention;

FIG. 11 is a top plan view of a fragmentary portion of one of the composite label webs shown in FIG. 10;

FIG. 12 is a sectional view taken along the line 12—12 of FIG. 11;

FIG. 13 is a view similar to FIG. 2, but illustrating another embodiment of the invention;

FIG. 14 is a top plan view of a fragmentary portion of one of the composite label webs shown in FIG. 13;

FIG. 15 is a sectional view taken along line 15—15 of FIG. 14;

DETAILED DESCRIPTION OF THE PREFERRED EMBODIMENTS

Figures 1, 6:
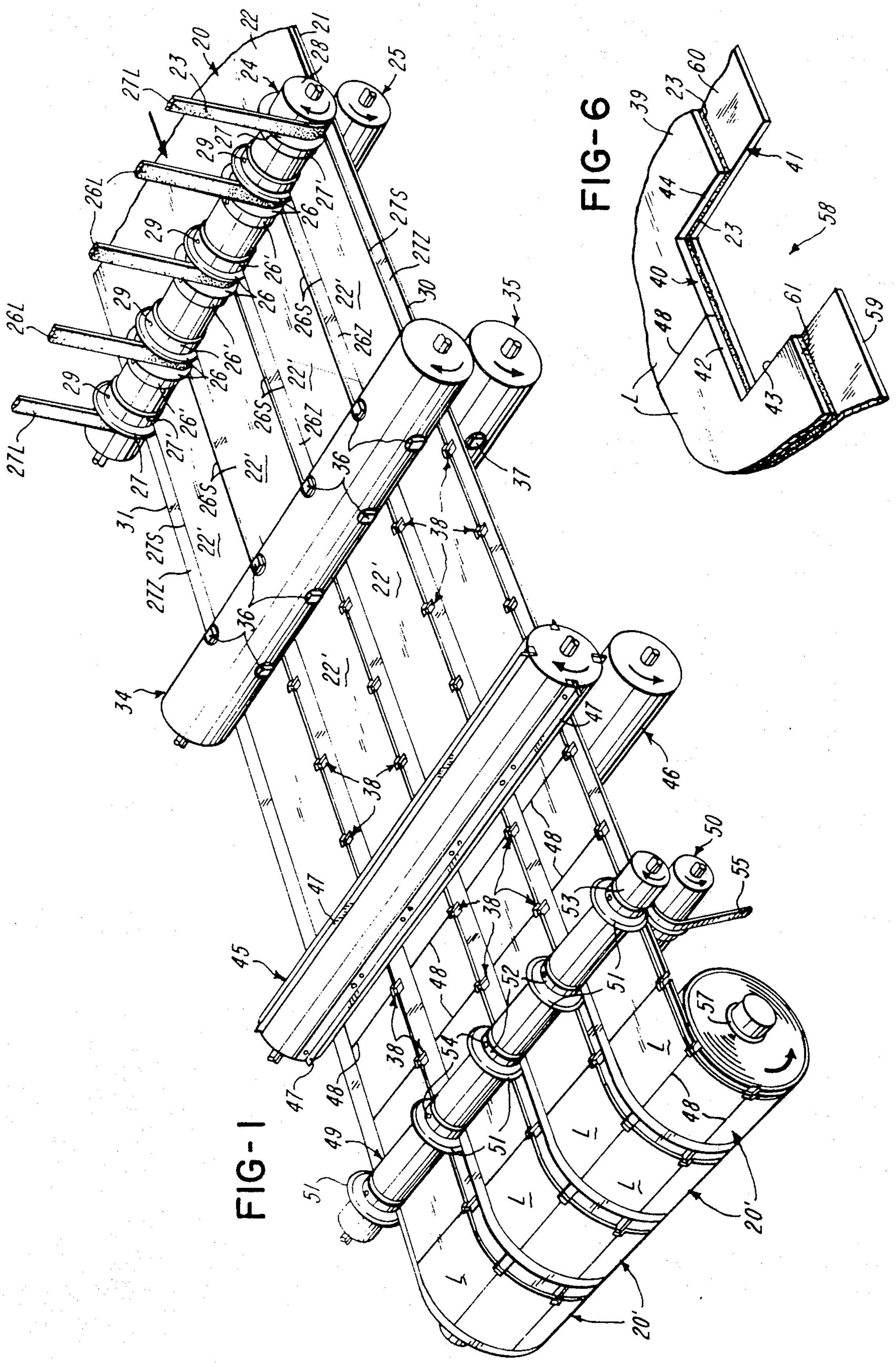
FIG. 1 is a perspective view illustrating a method of making composite label webs from a wide composite web, in accordance with the invention.
FIG. 6 is an enlarged perspective view of a fragmentary portion of one of the composite label webs shown in FIGS. 1 through 5.

Referring to the embodiment of FIGS. 1 through 6 and initially to FIG. 1, there is illustrated a method of making composite label webs in accordance with the invention. Initially, a relatively wide, longitudinally extending composite web generally indicated at 20 is provided. The composite web 20 includes a web or supporting material 21 to which a web of pressure-sensitive label material 22 is releasably adhered by pressure-sensitive adhesive 23. It is preferred that the adhesive 23 be in a continuous uniform coating on the underside of the label material 22, known as "full-gum" coating. A conventional release coating can be applied to the upper side of the web of supporting material 21. Next, the label material 22 is cut or slit longitudinally as illustrated in FIG. 1. The cutting or slitting steps is shown to be performed by a rotary cutter or slitter roll generally indicated at 24 and a cooperating back-up roll generally indicated at 25 between which the composite web 20 is advanced. The slitter roll 24 is shown to have closely spaced-apart pairs of slitting knives 26, and individual slitting knives 27. The knives 26 and 27 have respective hubs 26' and 27' adjustably secured to roll shaft 28 of the roll 24 as by set screws 29. The pairs of knives 26 make slits 26S through only the label material 22 at transversely spaced-apart locations between side edges 30 and 31 of the composite web 20. The knives 27 are spaced close to the side edges 30 and 31 and make slits 27S through only the label material 22. The label material 22 between each pair of slits 26S is stripped from the remainder of the composite web 20 in continuous strips 26L, and the label material 22 between the slits 27S and the respective side edges 30 and 31 of the web 20 is stripped from the remainder of the web 20 in continuous strips 27L. The strips 26L and 27L are shown to pass around the shaft 28 and extend away from the remainder of the web 20 by being pulled under a slight amount of tension. The strips 26L and 27L can be wound onto a suitable take-up device (not shown) as is known in the art. Stripping away the strips 26L and 27L exposes strip portions of the supporting material 21 at longitudinally extending zones 26Z and 27Z. The composite web 20 is now transformed into a composite web having a plurality of closely spaced-apart narrow label webs 22' on the supporting material 21.

After passing between the driven slitting roll 24 and the driven back-up roll 25 as described above, the continuously moving composite web 20 passes between a driven punch roll generally indicated at 34 and a mating driven die roll 35. The punch roll 34 carries punches 36 cooperable with mating dies 37 carried by the die roll 35. As the punch and die rolls 34 and 35 rotate, cooperating punches 36 and dies 37 cut holes generally indicated at 38 in the composite web 20.

With reference to FIGS. 1 and 2, the holes 38 are shown to be cut at longitudinally spaced-apart locations through the composite web 20, and more particularly the holes 38 are equally spaced-apart longitudinally. The holes 38 are cut through one marginal side edge 39 of each label web 22' and underlying supporting material 21 and through the supporting material 21 in the adjacent respective zones 26Z and 27Z. More particularly, each hole 38 forms a notch 40 in one marginal side edge of the associated composite label web 22' and a hole 41 in the supporting material. The outline of the notch 40 is in alignment with the outline of a portion of the related hole 41. With reference to FIG. 6, each notch 40 in the label web 22' is shown to be comprised of a longitudinal cut 42, and a pair of spaced-apart transverse cuts 43 and 44 which respectively extend to the opposed ends of the respective longitudinal cut 42.

After the holes 38 are cut in the composite web 20, the composite web 20 is passed between a driven, transversely extending cutter roll generally indicated at 45 and a driven transversely extending back-up roll generally indicated at 46. The cutter roll 45 is shown to have a plurality of angularly spaced-apart knives or cutters 47. The knives 47 are long enough to form transverse cuts in all the label webs 22'. The cuts 48 known as "butt cuts" are shown to extend entirely through the label webs 22', as best shown in FIG. 5. Thus, it is apparent that the knives 47 are set relative to the circular cylindrical roll 46 so as to cut through only the label material. Although the cuts 48 are shown to completely sever the label material which comprises the webs 22', the cuts 48 can be perforation cuts, in which event the knives 47 would have to be perforation cuts, in which event the knives 47 would have to be perforating knives (shown in FIG. 16). In the event the cuts 48 are to be perforation cuts it may in some application be desired to also make aligned perforation cuts in the supporting material, as in the case of above-mentioned U.S. patent application Ser. No. 257,913.

With reference to FIGS. 1 and 2, the web 20 next passes between a driven, transversely extending rotary cutter or slitter generally indicated at 49 and a driven transversely extending back-up roll generally indicated at 50. The slitter 49 has transversely spaced-apart rotary slitter knives 51. Each knife has a hub 52 adjustably mounted to a slitter shaft 53 by set screws 54 as best shown in FIG. 2. Thus each of the knives 51 can be located and secured to the shaft 53 at any selected transverse location. In setting up the slitter 49, the knives 51 are adjusted with respect to an aligning point forming part of the holes 38. More specifically, each hole 38 has a longitudinal side or cut portion 41' which serves as an aligning point for the respective slitter knife 51. The cut portion 41' is shown to be in the middle of the associated zones 26Z and inboard of the edges 30 and 31 of the zones 27Z, that is half way between the slits 26S of a pair of slits, and between the slits 27S and the respective edges 30 and 31. In addition to each of the knives 51 being individually adjustable, the entire slitter 49 is adjustable as a unit transversely with respect to the direction of travel of the web 20. Thus, the slitter 49 can be aligned for minute adjustment during the slitting step. It is apparent that the slitter 49 slits the supporting material 21 through the zones 26Z and 27Z, and thus forms narrow label webs 20' and trims off portions 55 and 56 of the supporting material 21 in the respective zones 27Z. The composite web 20' can now be wound into separate rolls on respective label cores 57. It is also feasible, according to known practice, to wind the label webs 20' into rolls without cores.

Slitting the composite web 20 causes the resultant composite webs 20' to have notches 58 formed along one marginal side edge. The notches 58 extend through the marginal side edge of the label web 22' and the underlying supporting material 21 and through the adjacent marginal edge of the supporting material to side edge 59 of the supporting material. A narrow strip 60 of the supporting material 21 existing between the side edge 59 of the supporting material 21 and the side edge 61 of the label material web 22'. The narrow srip 60 enables the labels L carried by the supporting material 21 to be readily stripped away by hand. Notches 58 are considered to be channel-shaped.

With reference to the embodiment of FIGS. 7, 8 and 9, there is shown a composite web **20*a* being slit into relatively narrow label webs 20*a*'. The composite web 20*a* is the same in construction as the web 20 shown in FIGS. 1 and 2 in that some of the holes 38*a*, namely holes 70, are rectangular in shape and extend through the marginal side edge of one label material web 22*a*' and the underlying supporting material 21*a*, through the adjacent label material web 22*a*' and the underlying supporting material 21*a*, and entirely across intervening zone 26Z*a* of exposed supporting material 21*a*. Other holes 38*a*, namely the holes 71, at the marginal side edges of the composite web 20*a* extend through the marginal side edge of one label web 22*a*' and the underlying supporting material 21*a*, and through the supporting material 21 at the respective zone 27Z*a*. The holes 70 and 71 are formed by punch and die rolls like the punch roll 34 and the cooperating die roll 35. The punches and the mating dies have configurations conforming to the shapes of the holes 70 and 71. Following the formation of the holes 70 and 71, the label web 22*a*' are severed along lines 48*a*** to form labels L*a*. Thereafter, the composite web **20*a* is slit into the narrower composite label webs 20*a*' by the cutter or slitter roll 45 and its cooperating back-up roll 46 (FIG. 1). The resultant composite label webs 20*a*' are identical in construction to the composite label web 20' shown in the embodiment of FIGS. 1 through 6, except that in the embodiment of FIGS. 7 through 9, notches 58*a* and 58*a*' are formed in each marginal side edge of each composite label web 20**a'.

With reference to the embodiment of FIGS. 10, 11 and 12, there is shown a composite web generally indicated at 20b being slit into relatively narrow label webs 20b'. The composite web 20b is the same in construction as the composite web 20 in FIGS. 1 and 2 except that some of the holes 38b are shown to be triangular rather than rectangular in construction. The holes 38b extend through the marginal side edge of one label material web 22b' and the underlying supporting material 21b, and through the adjacent supporting material 21b at zones 26Zb and 27Zb of the exposed supporting material 21b. The holes 38b are formed by punch and die rolls like the punch roll 34 and cooperating die roll 35, however, the punches and the mating dies have configurations conforming to the shape of the holes 38b. Following the formation of the holes 38b, and the webs 22b' are severed along lines 48b to form the labels Lb. Thereafter the composite web 20b is slit into the narrow composite label webs 20b' by the cutter or slitter roll 45 and its cooperating back-up roll 46 (FIG. 1). The resultant label webs 20b' are identical in construction to the composite label webs 20' shown in the embodiment of FIGS. 1 through 6, except that in the embodiment of FIGS. 10 through 12, notches 58b are V-shaped in construction and the vertex of the V is in alignment with respective transverse cut 48b.

With reference to the embodiments of FIGS. 13 through 15, there is shown a composite web 20c being slit into relatively narrow label webs 20c'. The composite web 20c is the same in construction as the composite web 20b in FIGS. 7, 8 and 9 except that the holes generally indicated at 38c are shown to be square and disposed in a diamond-shaped arrangement. Holes generally indicated at 38c include holes 90 and 91. The holes 90 extend through the marginal side edge of one label material web 22c' and the underlying supporting material 21c, through the adjacent label material web 22c' and the underlying supporting material 21c, and entirely across the intervening zone 36Zc of exposed supporting material 21c. The holes 91 at the marginal side edges of the web 20c extend through the marginal side edge of one label web 22c' and the underlying supporting material 21c, and through the supporting material 21c at the zones 27Zc. The holes 90 and 91 are formed by punch and die rolls like the punch roll 34 and the cooperating die roll 35. The punch and die rolls have configurations corresponding to the shapes of the holes 90 and 91. Following the formation of the holes 90 and 91, the label webs 22c' are severed along lines 48c to form labels Lc. Thereafter, the composite web 20c is slit into the composite label webs 20c' by the cutter or slitter roll 45 and its cooperating back-up roll 26 (FIG. 1). The resultant composite label webs 20c' are identical in construction to the composite label webs 20' shown in the embodiment of FIGS. 1 through 6, except that in the embodiment of FIGS. 13 through 15, V-shaped notches 58c and 58c' are formed in each marginal edge of each composite label web 20c'. The vertices of the V-shaped notches 58c and 58c' are in transverse alignment with transverse cuts 48c in the label material webs 22c'.

Figure 16:
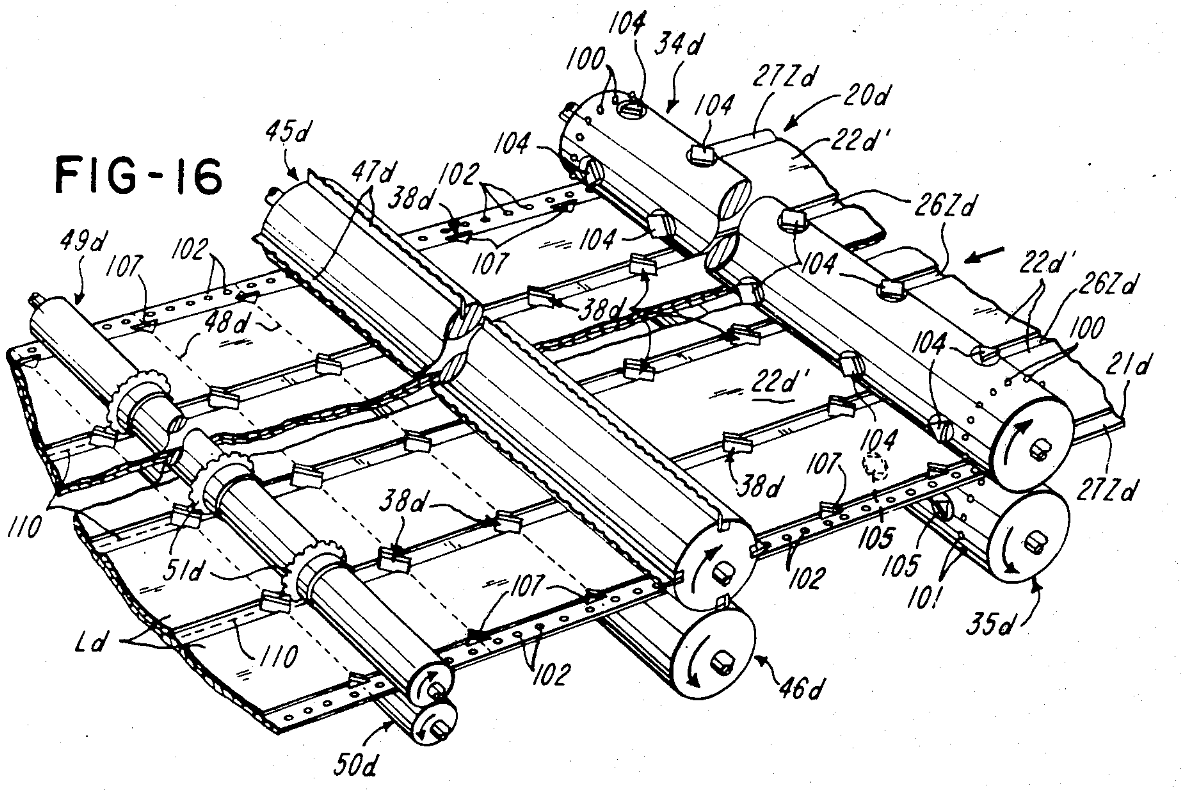
FIG. 16 is a perspective view illustrating a method of making another embodiment of a composite web.
Figure 17:
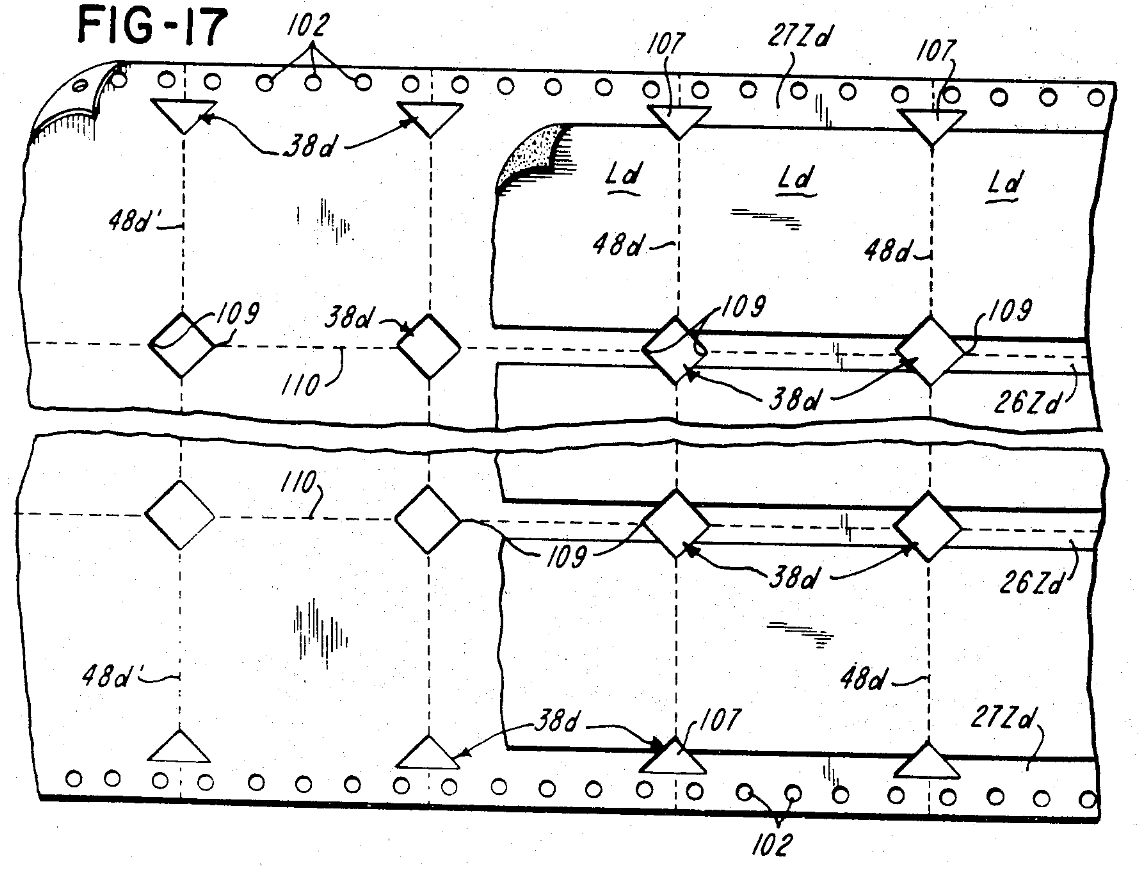
FIG. 17 is a partly broken away top plan view of portions of the composite web shown in FIG. 16.

With reference to the embodiment of FIGS. 16 and 17, the manufacture of composite web 20d is started in the same manner as the composite web 20 of the embodiment of FIGS. 1 through 6 to form narrow label material webs 22d' carried by the supporting material 21d. The label material 22d are closely spaced-apart leaving zones 26Zd of the supporting material 21d exposed and leaving exposed zones 27Zd beyond the side edges of the outermost label material webs 21d'. In this embodiment the supporting material 21d at the zones 27Zd provides feed strips.

The advancing web 20d passes between cooperating punch roll 34d and die roll 35d. The punch roll 34d carries punches 100 cooperable with dies 101 and the die roll 35d for forming feed holes 102 in the zones 27Zd at the respective marginal side edges. The punches 100 and the cooperating dies have shapes depending on the desired shape of the holes 102. They can be chadless holes as in U.S. Pat. No. 2,275,064 to Moore. Alternatively, feed arrangements such as disclosed in U.S. Pat. No. 2,259,358 to Templeton can be used.

The die roll 34d is also provided with multi-sided punches 103 and 104. The punches 103 and 104 are cooperable with respective dies 105 and 106 carried by the die roll 35d. The punches 103 and the cooperating dies 105 are shown, in the illustrated embodiment, to form triangular-shaped holes 107 at the marginal side edges of the composite web 20d. The holes 107 are cut through the marginal side edge of each of two of the label webs 22d' and the underlying supporting material 21d and through the supporting material 21d in the adjacent respective zones 27Zd. The punches 104 and the cooperating dies 106 cut through the composite web 20d to form multi-sided holes 38d shown to be square and to be disposed in a diamond-shaped arrangement. The holes 38d are cut through the marginal side edges of adjacent label material webs 22d' and the underlying supporting material 21d and through the zones 26Zd.

Thereafter the composite web 20d is shown to pass between cutter roll 45d and cooperating back-up roll 46d. While the cutter roll 45d can have either straight knives (FIG. 1) in this embodiment it is preferred to use perforating knives 47d (FIG. 16), the edges of which are interrupted at spaced-apart intervals so that the label material webs 22d' are only partially severed as indicated at 48d. The knives 47d are set relative to the back-up roll 46d to also partially sever the supporting material 21d along the same transverse lines as indicated at 48d'. As the composite web 20d continues to travel, it passes between a rotary cutter 49d and a cooperating back-up roll 50d. The rotary cutter 49d and the back-up roll 50d are identical to the cutter roll 49 and the back-up roll 50 shown in FIG. 1, with the exception that perforating cutters or knives indicated at 51d in FIG. 16 only partially sever the supporting material 21d directly through aligning points 109 of the holes 39d of zones 26Zd. The longitudinal lines of partial severing made by the cutters 51d are indicated at 110.

In the embodiment of FIGS. 16 and 17, the completed composite web 20d is preferably fan-folded to facilitate its storage. When it is ready to be used it can be fed through a suitable printer such as a line printer (not shown) which can print data such as price, inventory control information, store number and the like on the labels Ld. The feed holes 102 can be useful in feeding the completed web 20d through the printer. The printed web 20d is adaptable as to its method of use in that the user can sever a transverse strip of labels by manually tearing the supporting material along one or more transverse lines at partial severing 48d'. If the severing at 48 is completely through the transversely across the webs 21*d'* severing the supporting material 21*d* transversely separates the web along that transverse line. In the event, however, that the label webs 22*d'* are partially severed as indicated at 48*d* in the drawings, then the label material webs 22*d'* will also have to be torn there. It is sometimes desired to separate two or more transverse rows of labels L*d* from the supporting material 21*d* at one time. It is apparent that the web 20*d* can be manually torn at any desired transverse line or lines so that the stripped away part can have the desired number of rows of labels L*d*. The lines of partial severing 110 enable a longitudinal strip of the supporting material 21*d* and the labels L*d* which it carries to be stripped from the remainder of the composite web 20*d*. The labels L*d* can be removed in strips and conveniently applied to merchandise. It is sometimes desired to separate two or more longitudinal columns of labels L*d* from the supporting material 21*d* at one time. It is apparent that the web 20*c* can be manually torn at any desired line or lines of partial severing 110 so that the stripped away part can have the desired number of columns of labels L*d*. Accordingly, the web 20*d* is extremely versatile in its use.

A substantial advantage of the present invention as illustrated in the embodiments of FIGS. 1 through 17 is that the results achieved are accomplished using a full-gum composite web, rather than a patterned gum composite web as in the U.S. Pat. to Fox No. 2,095,437. The holes 38, 38*a*, 38*b*, 38*c* and 38*d* are cut through such a small portion of the respective label webs 22, 22*a'*, 22*b'*, 22*c'* and 22*d'*that the adhesive 23 on these label webs does not cause any problem of gumming-up the punches and dies which make these holes.

Although the composite webs 20, 20*d*, 20*b*, 20*c* and 20*d* are referred to in this application as being "wide" and the label material webs 22, 22*a'*, 22*b'*, 22*c'* and 22*d'* are referred to as being "narrow," these relative references are intended to be definitive of the relationship that exists and is not intended to limit these webs with respect to width. Additionally, the composite webs of the various embodiments can have any desired number of labels extending transversely across them as is desired. Although the strips 26L, 26L*a*, 26L*b*, 26L*c*, 26L*d*, 27L, 27L*a*, 27L*b*, 27L*c* and 27L*d* are shown relatively wide in relation to the respective label webs 22', 22*a'*, 22*b'*, 22*c'* and 22*d'*, this is only for the purpose of clarity of illustration. In practice, the strips 26L and 27L are narrow but are wide enough to be strong enough for stripping purposes. The widths of the strips 26L and 27L accordingly can vary with the thickness and composition of the label material 22. In one of the illustrated embodiments of FIGS. 1 through 17, the label material is comprised of conventional paper label stock having a thickness of about 0.0025 to 0.006 inch, and the strips 26L through 26L*d* and 27L through 27L*d* are each about three thirty-seconds (3/32) of an inch in width measured in the transverse direction. The label material webs 22' through 22*d''* can be of any desired widths. Moreover, the transverse widths of the composite webs 20' through 20*c'* and the spacing between the lines of partial severing 110 of the composite web 20*d* need not be equal.

In the set-ups shown in FIGS. 1 and 16, the slitting, stripping, hole cutting, transverse cutting and longitudinal cutting steps are illustrated as being performed in one continuous operation. It is apparent that these steps can be perpormed at different times, in different machines.

In the embodiment of FIGS. 1 through 6, each line of severing 48 is in alignment with the center of the respective holes 38. The severing 48, thus, extends to the center of the longitudinal cut 42 (FIG. 6). Should the cuts 48 be leading or lagging the position shown in FIGS. 1, 2, 3, 4, and 6, that is, should the line of severing 48 be closer to the transverse cut 43 and further from the transverse cut 44, or vice versa, due for example to inaccurate registration, there is still no ragged edge at the end of the label. Likewise, in the embodiment of FIGS. 7, 8 and 9, the lines of severing 48*a* extend through the centers of the holes 70 and 71. In the embodiments of FIGS. 10 through 12, and 13 through 15, and 17 and 17, the respective lines of severing and partial severing 48*b*, 48*c*, and 48*d'* and 48*d* extend through the corners and the centers of the holes 38*b*, 90 and 91, and 38*d* and 107.

It is apparent that although the method is illustrated as being practiced using rotary high speed equipment, the method can be practiced using flat-bed types of equipment, if desired. Although the longitudinal strips 26L and 27L are shown as being removed at the slitter, these strips can be removed by stripping apparatus disposed downstream of the slitter but upstream of the hole cutting station.

Other embodiments and modifications of this invention will suggest themselves to those skilled in the art, and all such of these as come within the spirit of this invention are included within its scope as best defined by the appended claims.

I claim:

1. A composite web of pressure-sensitive labels, comprising: a longitudinally extending composite web including a web of supporting material and pressure-sensitive label material having a continuous uniform coating of pressure-sensitive adhesive and being releasably adhered to the supporting material, the supporting material extending beyond the label material along a marginal side edge of the composite web to provide an exposed strip portion of supporting material, longitudinally spaced-apart open-sided notches in the marginal side edge through the label material and the underlying supporting material and the adjacent strip portion, each notch being formed in part by a longitudinal cut which constitutes the inner portion of the notch and formed in part by additional cuts extending from a respective end of the longitudinal cut and the side edge of the composite web, and transversely extending lines of at least partial severing in the label material at longitudinally spaced-aparts intervals, each transverse line of at least partial severing in the label material extending across the label material web generally perpendicularly to the longitudinal direction and intersecting the respective longitudinal cut at a location spaced from the ends of the respective longitudinal cut.

2. The composite web as defined in claim 1, wherein the additional cuts extend transversely with respect to the respective longitudinal cut.

3. The composite web as defined in claim 1, wherein at least one of the additional cuts is straight and extends transversely with respect to the respective longitudinal cut.

* * * * *